(12) United States Patent
Ohira (10) Patent No.: US 12,484,700 B2
(45) Date of Patent: Dec. 2, 2025

(54) CUSHION BODY (71) Applicant: TOYOTA BOSHOKU KABUSHIKI KAISHA, Aichi-ken (JP)

(72) Inventor: Satoru Ohira, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 242 days.

(21) Appl. No.: 18/514,025

(22) Filed: Nov. 20, 2023

(65) Prior Publication Data
US 2024/0172873 A1 May 30, 2024

(30) Foreign Application Priority Data

Nov. 24, 2022 (JP) .................. 2022-187195

(51) Int. Cl.
*B60N 2/56* (2006.01)
*A47C 7/74* (2006.01)
*A47C 27/07* (2006.01)
*B60N 2/58* (2006.01)

(52) U.S. Cl.
CPC .............. *A47C 7/746* (2013.01); *A47C 7/744* (2013.01); *B60N 2/5657* (2013.01)

(58) Field of Classification Search
CPC .. B60N 2/5642; B60N 2/5657; B60N 2/5635; B60N 2/62; B60N 2/565
See application file for complete search history.

(56) References Cited

U.S. PATENT DOCUMENTS

| 6,179,706 | B1* | 1/2001 | Yoshinori | B60N 2/5657 297/180.14 |
| 7,931,330 | B2* | 4/2011 | Itou | B60N 2/5635 297/180.14 |
| 8,662,579 | B2* | 3/2014 | Yoshizawa | B60N 2/5657 297/180.13 |
| 9,365,142 | B1* | 6/2016 | Line | B60N 2/62 |
| 9,756,408 | B2* | 9/2017 | Ferretti | B60N 2/879 |
| 9,902,293 | B2* | 2/2018 | Line | B60N 2/0284 |
| 10,239,431 | B2* | 3/2019 | Line | B60N 2/62 |
| 10,279,714 | B2* | 5/2019 | Line | B60N 2/62 |
| 10,517,405 | B2* | 12/2019 | Katsuura | A47C 1/11 |
| 10,709,251 | B1* | 7/2020 | Rothman | A47C 7/18 |
| 10,856,664 | B2* | 12/2020 | Bhatia | A47C 7/746 |
| 11,186,210 | B2* | 11/2021 | Abe | B60N 2/5635 |
| 11,648,857 | B2* | 5/2023 | Bauer | B60N 2/5642 454/120 |

(Continued)

FOREIGN PATENT DOCUMENTS

JP 2018-144591 9/2018

*Primary Examiner* — Shin H Kim
(74) *Attorney, Agent, or Firm* — Greenblum & Bernstein, P.L.C.

(57) ABSTRACT

A cushion body includes a seat pad having a concave ventilation flow path extending along a pad rear surface of the seat pad, and a planar flow path lid covering the pad rear surface of the seat pad so as to cover the concave ventilation flow path. The seat pad has an expanded flow path in which a flow path width of the ventilation flow path is partially expanded, and the planar flow path lid includes a contact portion in contact with the pad rear surface, and a lid curved to cover the concave ventilation flow path including the expanded flow path at a position retracted to a seat rear side with respect to the contact portion.

9 Claims, 10 Drawing Sheets

(56) References Cited

U.S. PATENT DOCUMENTS

| | | | |
|---|---|---|---|
| 2013/0140857 A1* | 6/2013 | Shin | B60N 2/5657 297/180.13 |
| 2018/0126881 A1* | 5/2018 | Ui | B60N 2/58 |
| 2019/0232835 A1* | 8/2019 | Murakami | B60N 2/58 |
| 2019/0298072 A1* | 10/2019 | Bhatia | B60N 2/565 |
| 2021/0076827 A1* | 3/2021 | Wu | A47C 7/021 |

* cited by examiner

CUSHION BODY

CROSS REFERENCE TO RELATED APPLICATION

This application is based on Japanese Patent Applications No. 2022-187195 filed on Nov. 24, 2022, the entire contents of which are incorporated herein by reference.

TECHNICAL FIELD

The present invention relates to a cushion body. More specifically, the present invention relates to a cushion body including: a seat pad having a concave ventilation flow path extending along a pad rear surface of the seat pad; and a planar flow path lid covering the pad rear surface of the seat pad so as to cover the ventilation flow path.

BACKGROUND ART

JP2018-144591A discloses a cushion body including: a seat pad having a concave ventilation flow path formed along a pad rear surface of the seat pad; and a flow path lid covering the ventilation flow path from the seat rear side. The seat pad has a hard duct inserted into the pad so as to form the inner peripheral wall of the ventilation flow path. According to this duct, the cushion body can hold the ventilation flow path without collapsing even when receiving the seating pressure. This can ensure the ventilation flow path, thereby preventing deterioration of the ventilation performance.

In the configuration provided with the duct, the number of parts of the seat pad is increased, which may complicate the manufacturing procedure and the working man-hours of the cushion body. In addition, if the cushion body has a thin portion, the seated occupant may have an uncomfortable feeling when seated due to the duct. In view of the above, the present invention provides a cushion body that ensures a ventilation flow path without providing a duct for reinforcement and prevents a decrease in ventilation performance.

SUMMARY OF INVENTION

In order to solve the above problems, the cushion body of the present invention takes the following means.

A cushion body may include a seat pad having a concave ventilation flow path extending along a pad rear surface of the seat pad, and a planar flow path lid covering the pad rear surface of the seat pad so as to cover the concave ventilation flow path. The seat pad may have an expanded flow path in which a flow path width of the ventilation flow path is partially expanded, and the planar flow path lid includes a contact portion in contact with the pad rear surface, and a lid curved to cover the concave ventilation flow path including the expanded flow path at a position retracted to a seat rear side with respect to the contact portion. In this way, since the lid covers the expanded flow path at a position retracted to the seat rear side, the thickness of the seat pad can be ensured according to the amount of retraction of the lid. Therefore, it is possible to appropriately ensure the depth of the ventilation flow path including the expanded flow path, and it is possible to prevent a decrease in ventilation performance due to the collapse of the flow path. Further, the shape of the lid retracted toward the seat rear side with respect to the contact portion can enhance the surface rigidity of the lid. Thereby, according to the configuration in which the flow path lid is in contact with the support structure on the seat rear side and is supported from the seat rear side, the load received from the seat front surface can be efficiently dispersed to the support structure, and local collapse of the cushion body can be reduced.

The lid may have a rib protruding toward an inside of the concave ventilation flow path at the expanded flow path. Accordingly, the rigidity of the lid covering the expanded flow path can be enhanced by the rib. Therefore, it is possible to reduce the collapse of the expanded flow path due to the seating pressure.

The lid may have a rib protruding toward an inside of the concave ventilation flow path at the expanded flow path. Accordingly, the rib can rectify the flow of air in the expanded flow path along the flow path axis.

The rib may extend across a hanging-in groove configured to hold therein a seat cover and formed on a pad front surface of the seat pad when viewed in a pad thickness direction. Accordingly, the reinforcement by the rib can rationally reduce the collapse of the periphery of the hanging-in groove in which the pad thickness is reduced due to the formation of the hanging-in groove.

The lid may include a connecting port to a connecting member connected to communicate with the ventilation flow path, and a flange protruding in a flange shape from an inner peripheral edge of the connecting port toward the inside of the expanded flow path of the concave ventilation flow path. Thus, by providing the flange, the rigidity of the lid can be further enhanced.

The seat pad may form a back pad which is a pad member of a seatback, and the lid may include a support contact portion configured to be in contact with a lumbar support for supporting a lower region of the seatback from the seat rear side, and a connecting lid formed with a connecting port to a connecting member connected above the lumbar support to communicate with the ventilation flow path. Accordingly, the lower region of the seatback can be more appropriately supported by the lumbar support. Further, the support contact portion can appropriately disperse the seating load applied to the seatback by the lid being in contact with the lumbar support. Further, the connecting member can be rationally provided at a position without interfering with the lumbar support.

DESCRIPTION OF EMBODIMENTS

Hereinafter, embodiments of the present invention will be described with reference to FIGS. 1 to 10. In the following description, the directions such as front, rear, up, down, left, and right indicate directions illustrated in the drawings.

First Embodiment

Figure 1:
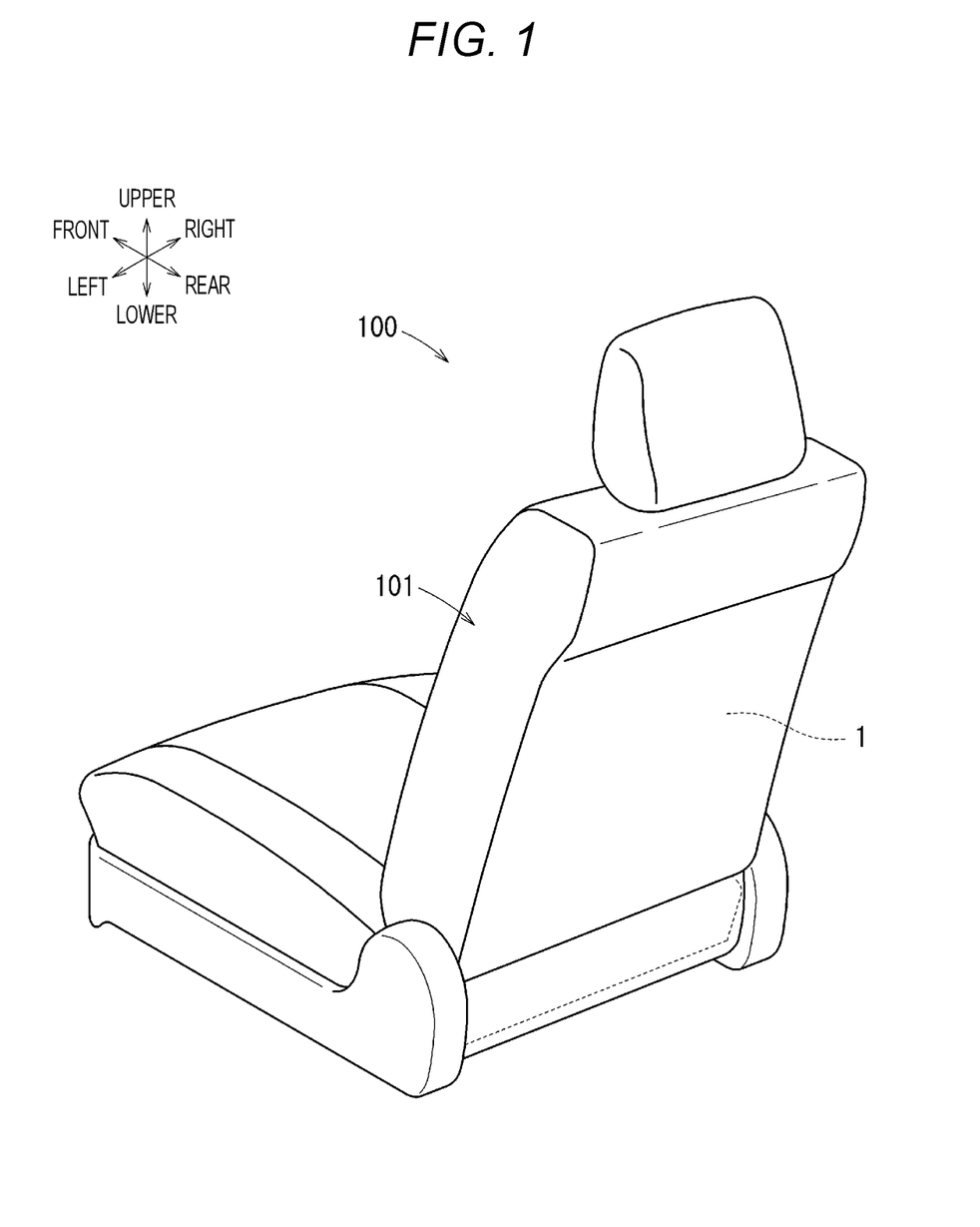
FIG. 1 is a perspective view of a cushion body according to a first embodiment.
Figure 2:
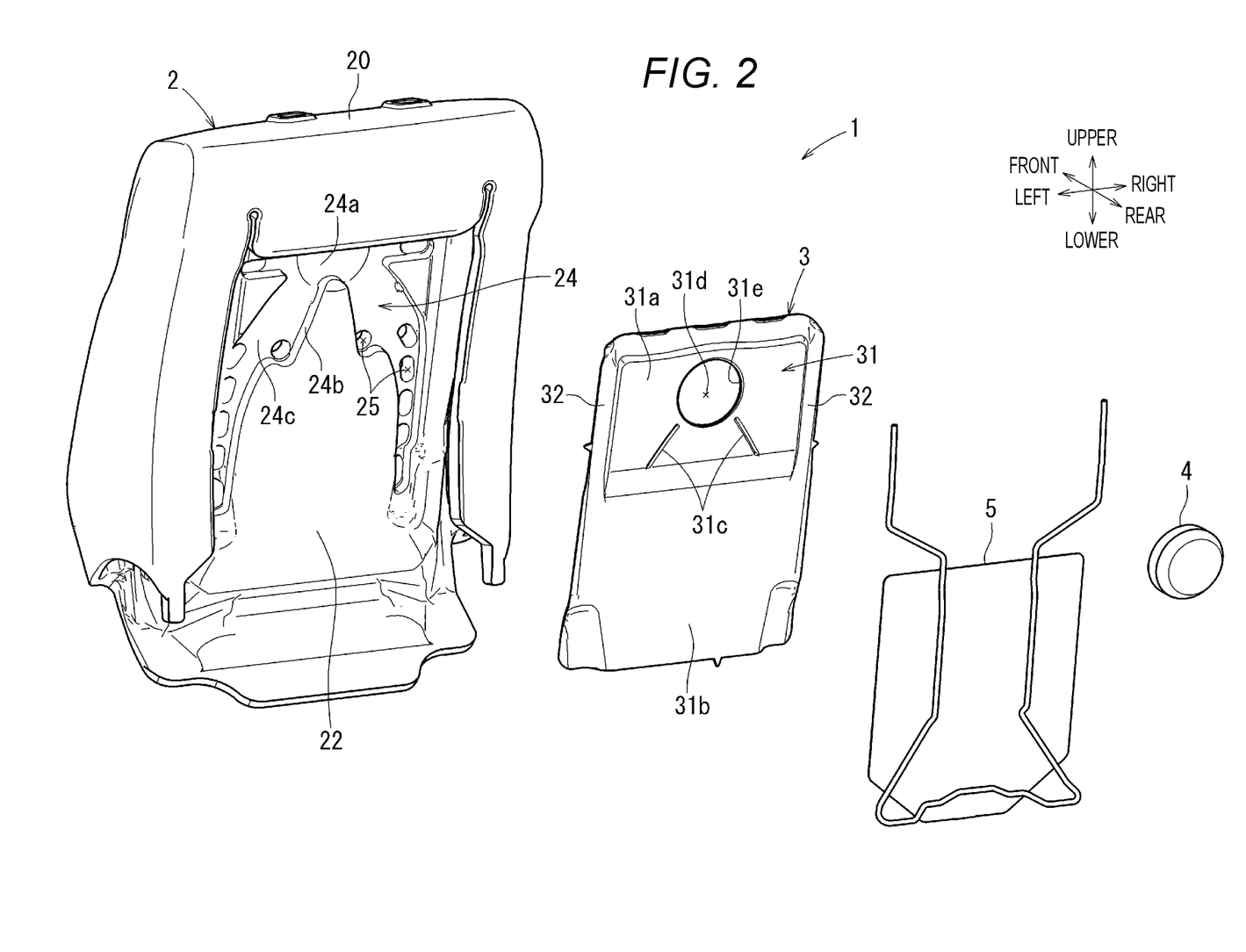
FIG. 2 is an exploded perspective view of the cushion body.

First, a cushion body 1 according to a first embodiment of the present invention will be described. As illustrated in FIG. 1, the cushion body 1 is applied to a seatback 101 of an automobile seat 100. The cushion body 1 is assembled to a back frame (not illustrated), and has a back cover covered thereon to form the seatback 101. As illustrated in FIG. 2, the cushion body 1 includes a back pad 2 forming a cushion member of the seatback 101, and a flow path lid 3 assembled to cover the rear surface of the back pad 2. A fan 4 for performing seat air conditioning is connected to the flow path lid 3.

As illustrated in FIGS. 2, 3, 5 and 6, the back pad 2 includes a pad body 20 that elastically supports the back of the seated person, and a concave ventilation flow path 24 that extends along a pad rear surface 22 of the pad body 20. The pad body 20 is formed of a polyurethane foam molded body. The ventilation flow path 24 is open toward the rear of the seat, and the opening is closed by the flow path lid 3. The back pad 2 has a plurality of vent holes 25 penetrating from a plurality of positions of the ventilation flow path 24 to the pad front surface 21. Here, the back pad 2 corresponds to a "seat pad" of the present invention.

The back pad 2 is configured such that the air conditioning of the fan 4 efficiently functions by the ventilation flow path 24 and the vent 25. Specifically, the fan 4 blows air toward the rear of the cushion body 1, so that the air is suctioned into the vent holes 25 from the pad front surface 21. The air suctioned into the vents 25 flows to a connecting port 31d of the flow path lid 3 through the ventilation flow path 24, and is exhausted to the rear of the cushion body 1 by the fan 4. Accordingly, the heat retained in the pad body 20 can be efficiently released to the outside together with the flow of air, and the comfort of the seatback 101 can be improved. The fan 4 according to the present embodiment is configured to generate a flow of air from the pad front surface 21 toward the pad rear surface 22 as described above. The air may be, for example, directly sent toward the seated occupant by suctioning air from the pad rear surface 22.

Cushion Body 1

Hereinafter, each configuration of the cushion body 1 will be described in detail. The peripheral edge of the cushion body 1 is supported by a frame-shaped back frame (not illustrated) from behind. The cushion body 1 is supported at the lower portion of the back surface thereof by a lumbar support 5 (see FIGS. 2 and 3) assembled to the back frame. The lumbar support 5 is in contact with the flow path lid 3 of the cushion body 1 from the seat rear side.

Back Pad 2

Figure 6:
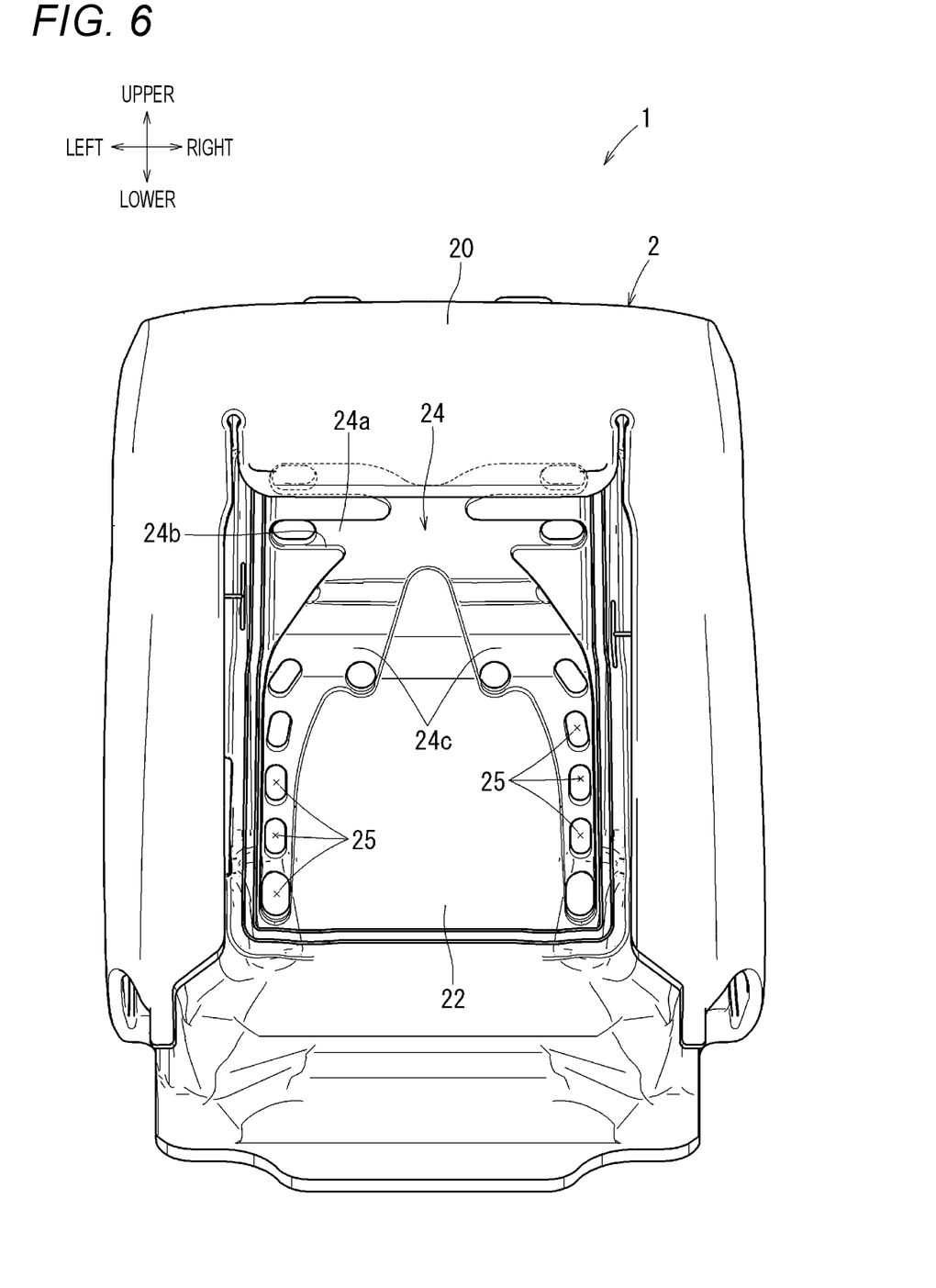
FIG. 6 is a rear view removed of a flow path lid.

As illustrated in FIG. 6, the ventilation flow path 24 of the back pad 2 is formed in a shape extending along the pad rear surface 22 while being branched in six directions. The ventilation flow path 24 has a bottom surface 24a at the recessed tip thereof and a side surface 24b rising from the periphery of the bottom surface 24a in a standing wall shape. The ventilation flow path 24 has two expanded flow paths 24c that are partially expanded so that the flow path width of one part is relatively larger than the flow path width of the other part. Most of the expanded flow paths 24c and the ventilation flow path 24 is provided upper than the central portion in the height direction of the pad rear surface 22.

As illustrated in FIG. 6, the flow path extending downward from each expanded flow path 24c is provided with a plurality of vent holes 25. Therefore, a large amount of air can flow into the ventilation flow path 24 from each vent 25. A large amount of the inflowing air quickly flows into each of the expanded flow paths 24c. Since the flow path width of each expanded flow path 24c is expanded, the flow velocity of the inflowing air can be reduced. By reducing the flow velocity, the fan 4 can appropriately suction the inflowing air. According to the above configuration, the ventilation flow path 24 is configured such that the fan 4 can suction a sufficient amount of air and efficiently discharge the air.

Figure 4:
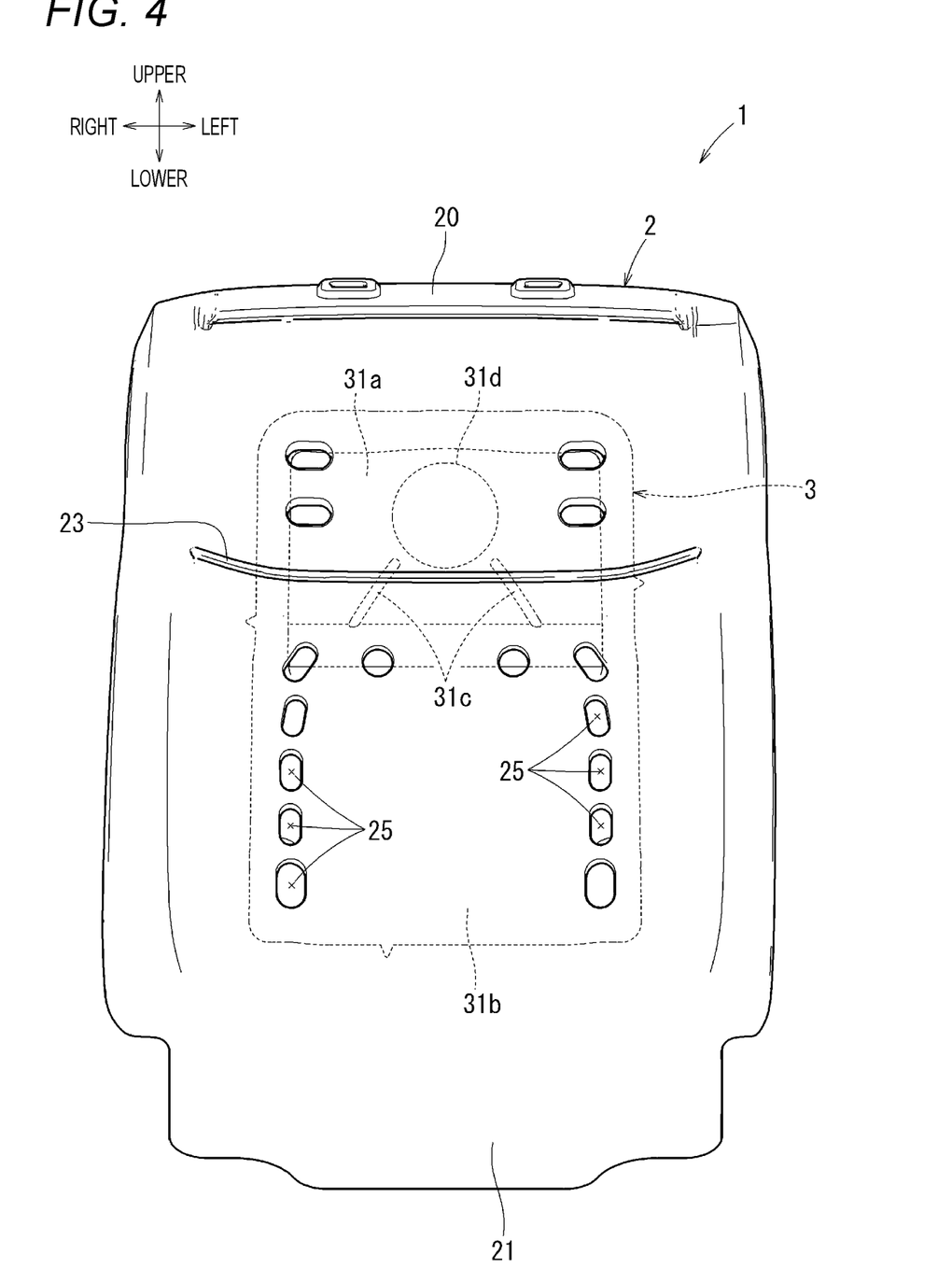
FIG. 4 is a front view of the cushion body.

As illustrated in FIG. 4, the back pad 2 has a concave hanging-in groove 23 extending in the left-right direction in the pad front surface 21. The hanging-in groove 23 is for hanging therein a back cover (not illustrated). The hanging-in groove 23 is provided with a wire (not illustrated) for locking a hook member such as a hog ring. By fixing the back cover to the wire by the hook member while being hung in the hanging-in groove 23, the back cover can be stretched in close contact with the pad front surface 21. The pad rear surface 22 of the back pad 2 is integrally formed with a back surface member (not illustrated) in close contact with the pad rear surface 22 including the inner peripheral wall of the ventilation flow path 24. The back surface material is impregnated with the foam material of the pad body 20 during the shaping, thereby cured integrally with the pad rear surface 22. This can enhance the rigidity of the pad rear surface 22.

Flow Path Lid 3

Figure 3:
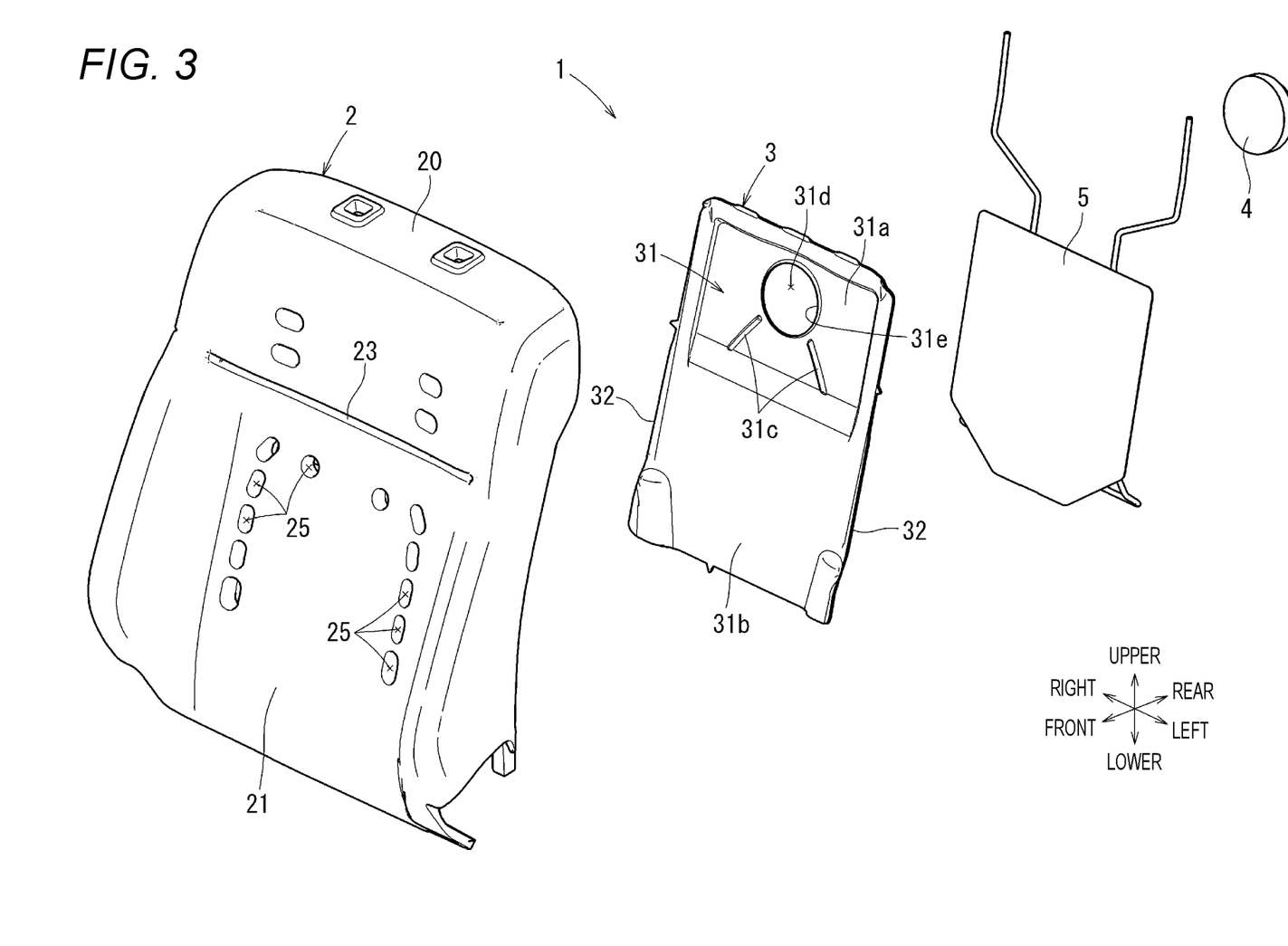
FIG. 3 is an exploded perspective view of FIG. 2 as viewed from the seat front side.
Figure 5:
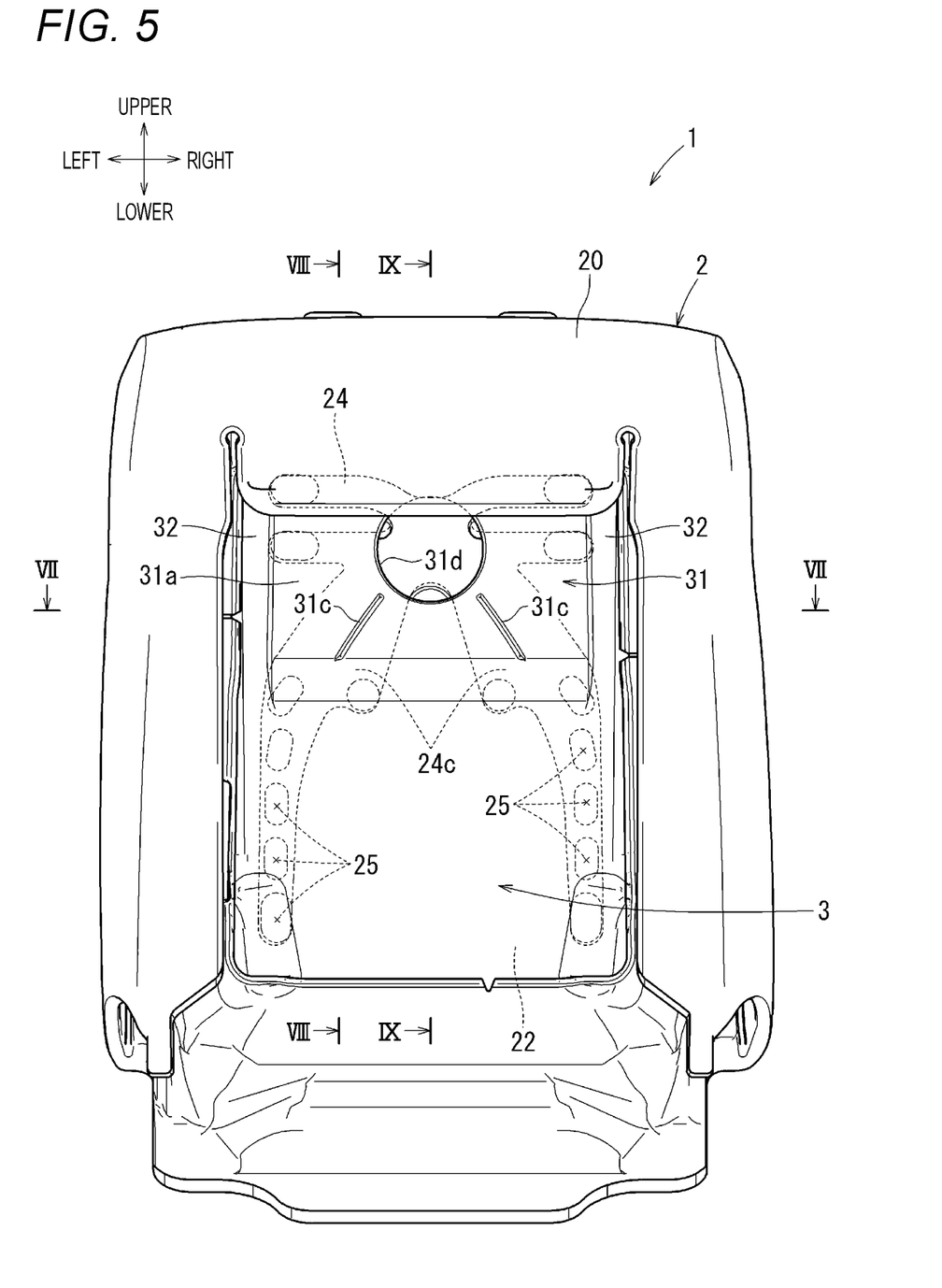
FIG. 5 is a rear view of the cushion body.

As illustrated in FIGS. 2 and 3, the flow path lid 3 is a substantially rectangular member that is assembled to widely cover the pad rear surface 22 from the seat rear side. As illustrated in FIG. 5, the flow path lid 3 has a lid 31 at the central portion in the in-plane direction. The lid 31 covers the ventilation flow path 24 from the seat rear side by assembling the flow path lid 3 to the pad rear surface 22. The flow path lid 3 has a contact portion 32 in contact with the pad rear surface 22 at the peripheral edge thereof. The contact portion 32 is bonded to the pad rear surface 22 by an adhesive. Thus, the flow path lid 3 is integrally assembled to the pad rear surface 22.

Figure 7:
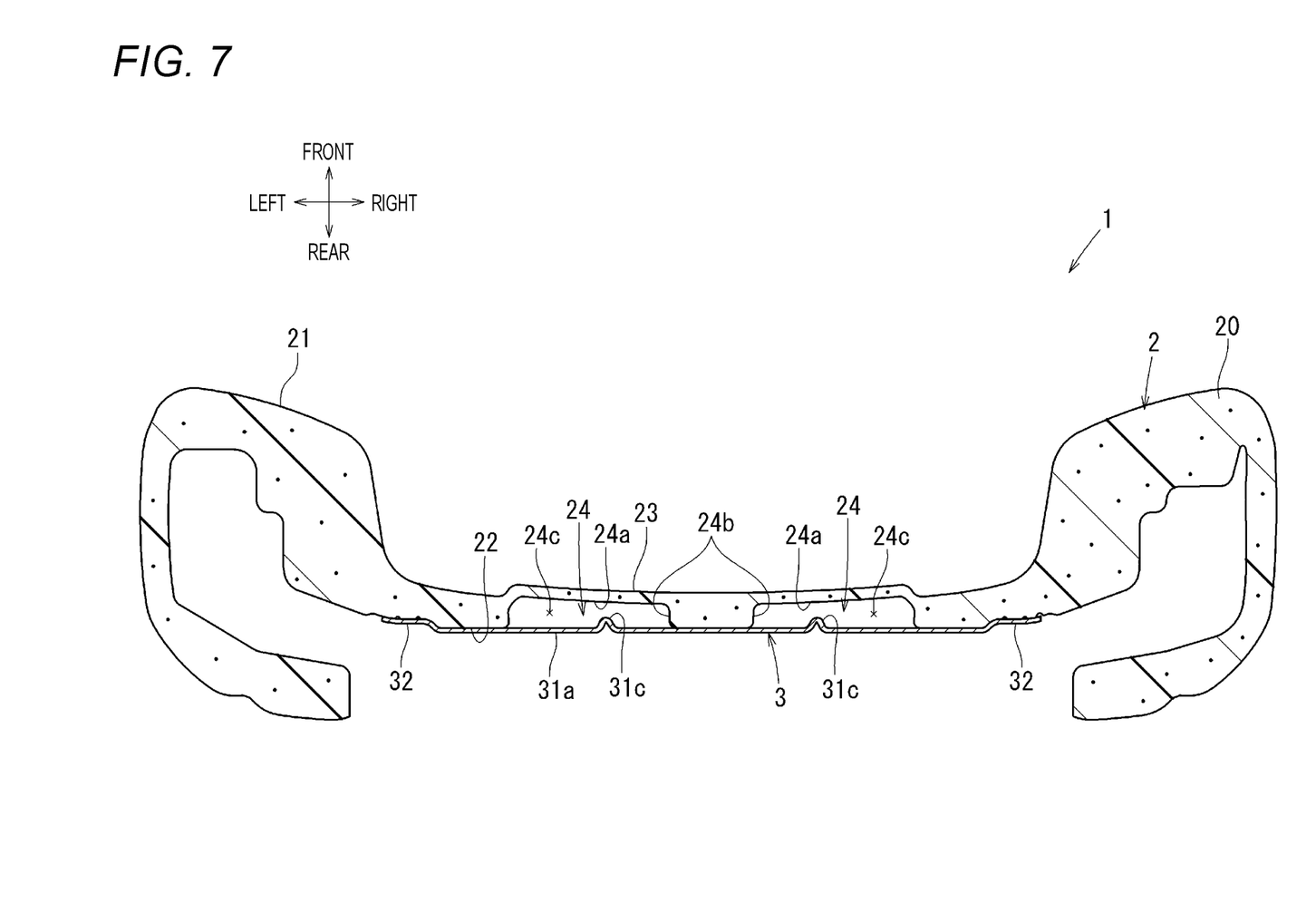
FIG. 7 is a cross-sectional view taken along line VII-VII of FIG. 5.

As illustrated in FIG. 5, the lid 31 has a connecting lid 31a in the upper region thereof. The connecting lid part 31a is configured to cover most of the ventilation flow path 24 including the expanded flow paths 24c. As illustrated in FIGS. 2 and 7, the connecting lid 31a has a stepped shape protruding from the contact portion 32 toward the rear of the seat. With this extended shape, the connecting lid 31a can enhance the rigidity of the lid 31 against the seating load. Further, the thickness of the pad body 20 can be ensured according to the amount of the lid 31 protruding rearward. Accordingly, it is possible to ensure a larger depth of the ventilation flow path 24. Therefore, even if the ventilation flow path 24 is compressed in the depth direction upon receiving the seating load from the seat front side, the ventilation performance of the ventilation flow path 24 can be prevented from deteriorating compared to a case where the flow path lid 3 has a flat and flush shape.

Figure 8:
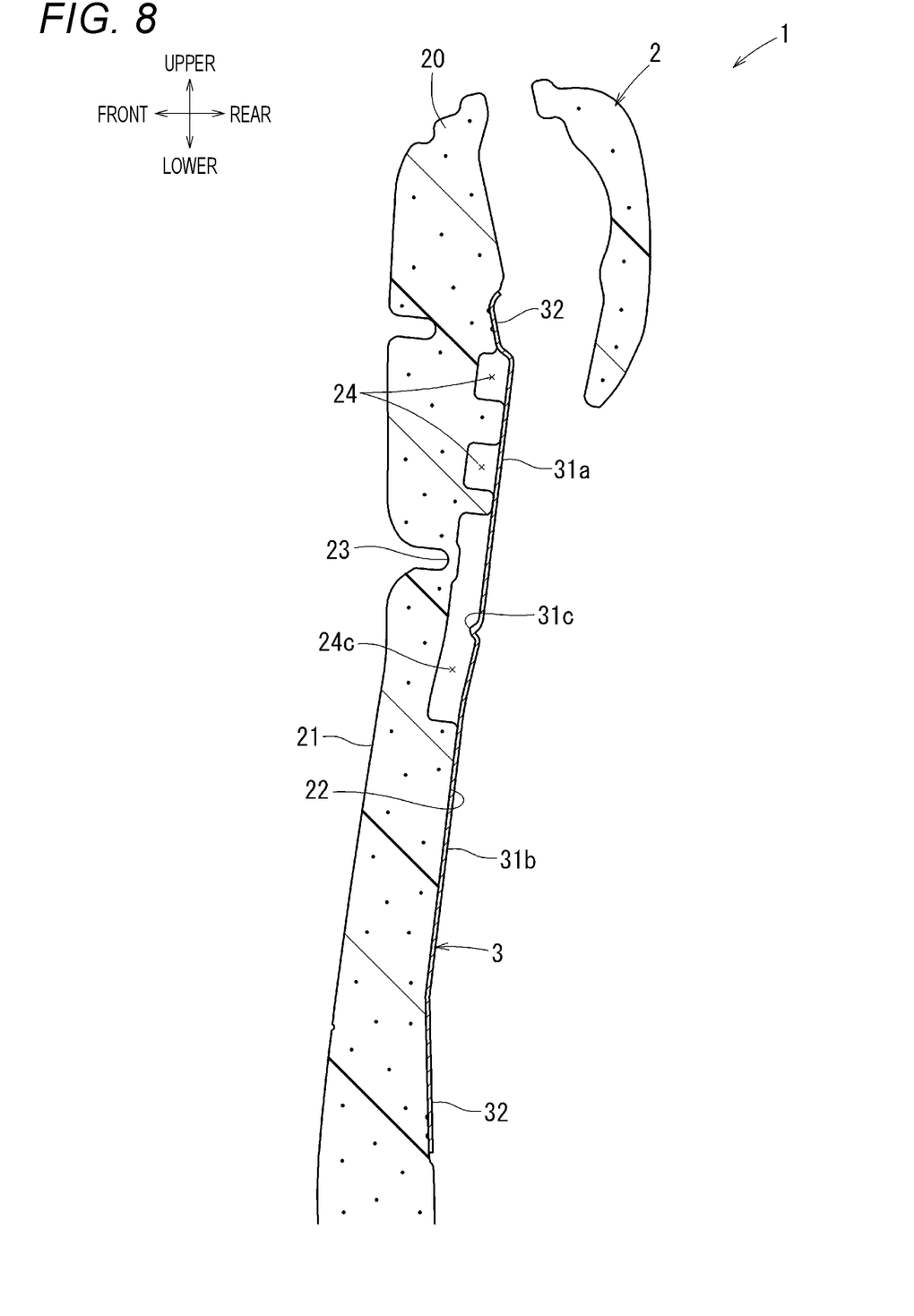
FIG. 8 is a cross-sectional view taken along line VIII-VIII of FIG. 5.

As illustrated in FIGS. 5 and 7 to 8, the connecting lid part 31a has ribs 31c protruding toward the inside of the flow path of each expanded flow path 24c. The ribs 31c can further enhance the rigidity of the lid 31. The ribs 31c serve as obstacles to the air flowing through the expanded flow paths 24c, thereby reducing the flow velocity of the air. As illustrated in FIG. 5, each rib 31c has a shape extending in a stripe shape along the flow path axis of each expanded flow path 24c. Accordingly, each rib 31c can rectify the flow of air in each expanded flow path 24c into a flow along the flow path axis. In addition, each rib 31c is provided such that the position thereof in the in-plane direction overlaps the substantially central portion in the flow path width direction of each expanded flow path 24c.

Figure 9:
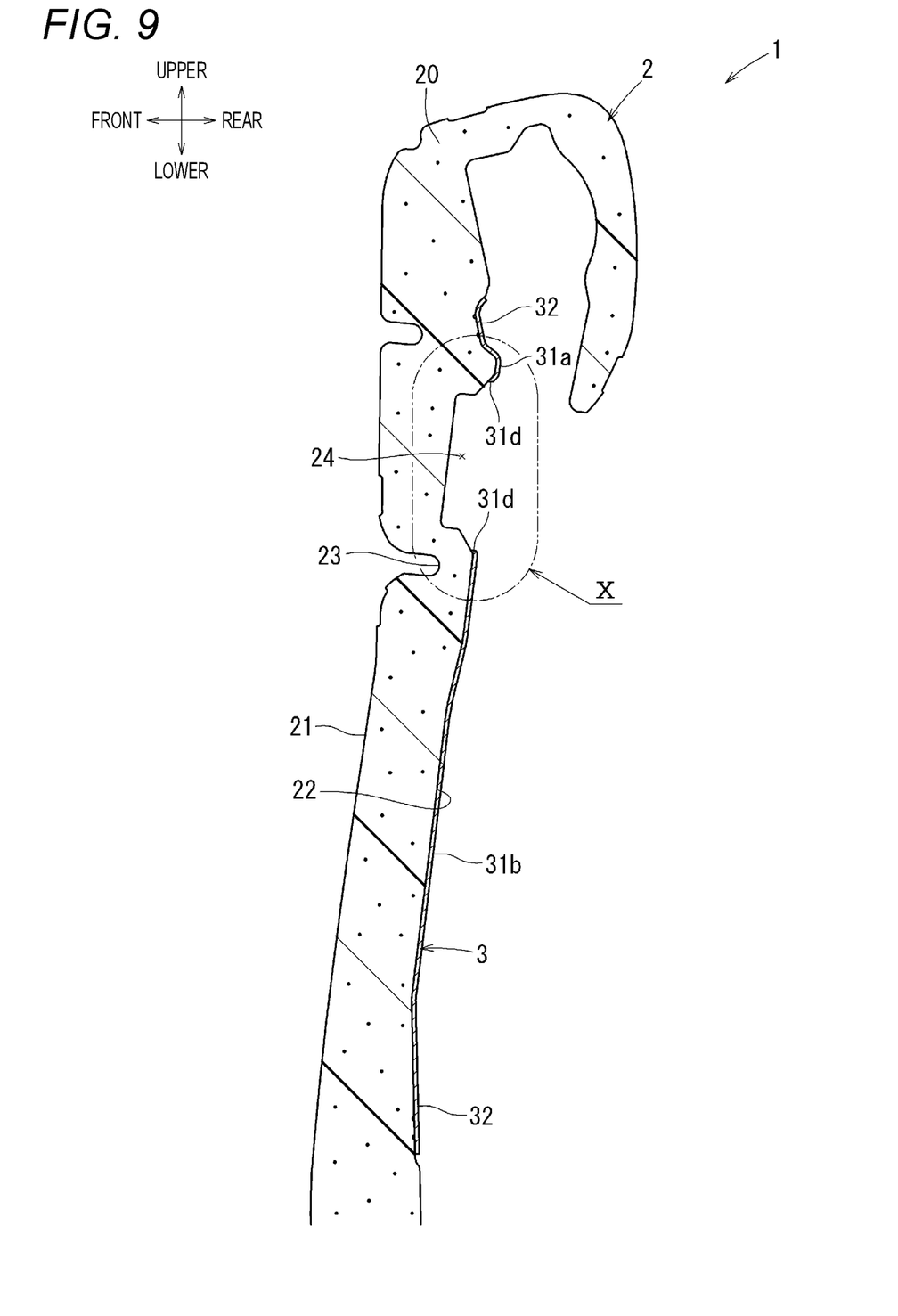
FIG. 9 is a cross-sectional view taken along line IX-IX of FIG. 5.
Figure 10:
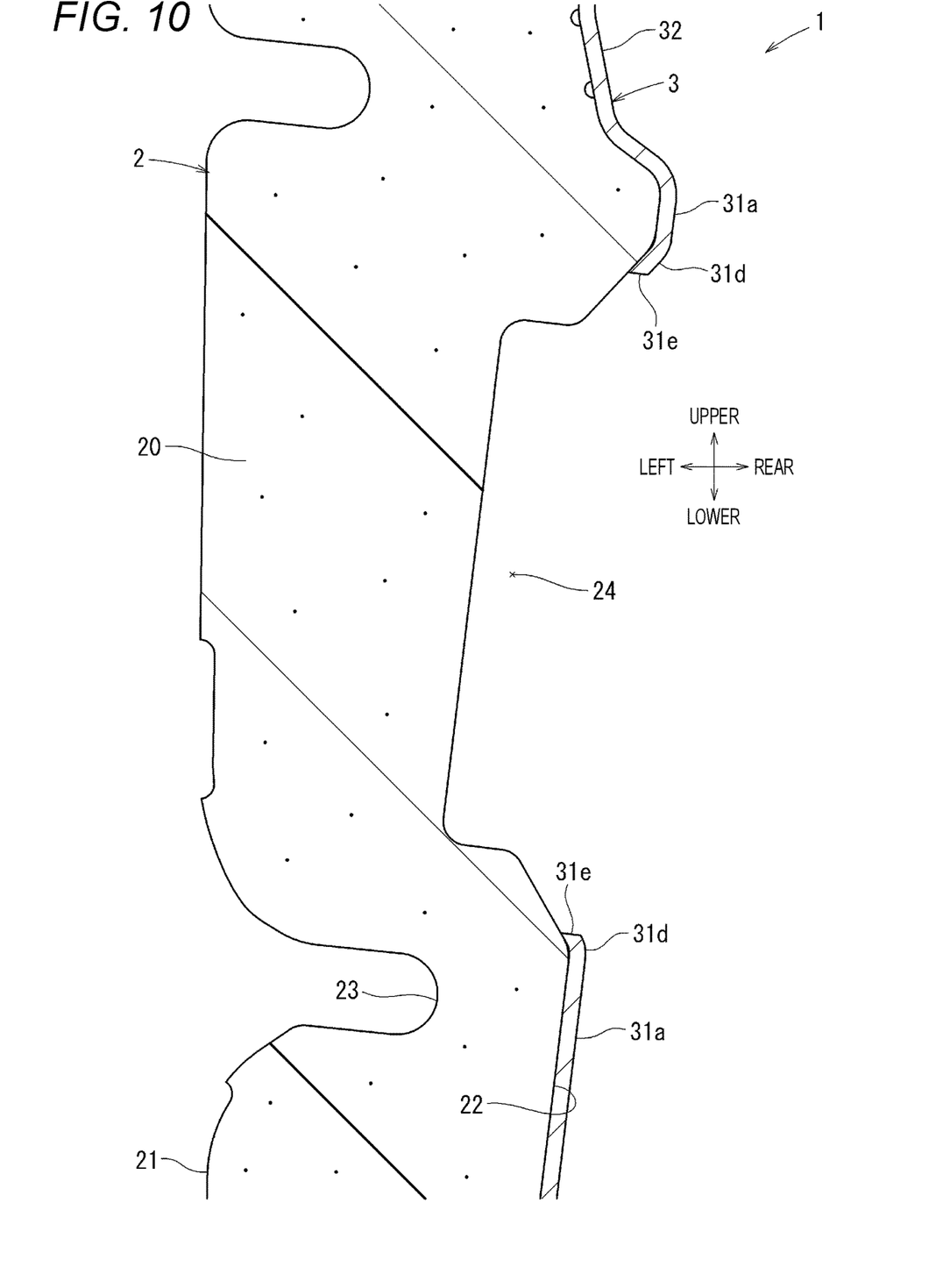
FIG. 10 is an enlarged view of a portion X in FIG. 9.

As illustrated in FIGS. 2 to 5, the connecting lid 31a has a connecting port 31d opened in a circular shape. The fan 4 is connected to the connecting port 31d from the seat rear side. The connecting port 31d allows the ventilation flow path 24 and the fan 4 to communicate with each other. As illustrated in FIGS. 9 and 10, the connecting port 31d has a flange 31e protruding in a flange shape from the inner peripheral edge of the connecting port 31d toward the inside of the flow path of the ventilation flow path 24. The flange 31e can further enhance the rigidity of the lid 31. Here, the fan 4 corresponds to a "connecting member" of the present invention.

The lid 31 has a support contact portion 31b in the lower region thereof. As illustrated in FIGS. 5 and 9, the support contact portion 31b is formed to extend substantially flush with the contact portion 32. The support contact portion 31b is in contact with the lumbar support 5 which supports the lower region of the back pad 2 from the seat rear side. Since the lid 31 having enhanced rigidity is in contact with the lumbar support 5, the seating load applied to the back pad 2 can be appropriately dispersed to the lumbar support 5 via the lid 31. Therefore, collapse of the pad body 20 due to the seating load can be reduced.

As described above, the connecting lid 31a and the ribs 31c which enhance the rigidity of the lid 31 overlap the expanded flow paths 24c and the hanging-in groove 23 of the pad body 20, which are likely to be affected by the seating load in the in-plane direction. This can appropriately prevent local collapse around the expanded flow paths 24c and the hanging-in groove 23. Further, by connecting the fan 4 to the connecting lid 31a, the fan 4 can be rationally provided at a position without interfering with the lumbar support 5 while appropriately supporting the fan 4.

In summary of the above, the cushion body according to the first embodiment has the following configuration. In the following description, the reference numerals in parentheses correspond to the components illustrated in the above embodiment.

That is, the cushion body (1) includes: the seat pad (2) having the concave ventilation flow path (24) extending along the pad rear surface (22) of the seat pad (2); and the planar flow path lid (3) covering the pad rear surface (22) of the seat pad (2) so as to cover the ventilation flow path (24). The seat pad (2) has the expanded flow path (24c) in which the flow path width of the ventilation flow path (24) is partially expanded. The flow path lid (3) includes the contact portion (32) in contact with the pad rear surface (22), and the lid (31) curved to cover the ventilation flow path (24) including the expanded flow path (24c) at a position retracted to the seat rear side with respect to the contact portion (32). In this way, since the lid (31) covers the expanded flow path (24c) at a position retracted to the seat rear side, the thickness of the seat pad (2) can be ensured according to the amount of retraction of the lid (31). Therefore, it is possible to appropriately ensure the depth of the ventilation flow path (24) including the expanded flow path (24c), and it is possible to prevent a decrease in ventilation performance due to the collapse of the flow path. Further, the shape of the lid (31) retracted toward the seat rear side with respect to the contact portion (32) can enhance the surface rigidity of the lid (31). Thereby, according to the configuration in which the flow path lid (3) is in contact with the support structure on the seat rear side and is supported from the seat rear side, the load received from the seat front surface can be efficiently dispersed to the support structure, and local collapse of the cushion body (1) can be reduced.

The lid (31) has the rib (31c) protruding toward the inside of the flow path of the expanded flow path (24c). Accordingly, the rigidity of the lid (31) covering the expanded flow path (24c) can be enhanced by the rib (31c). Therefore, it is possible to reduce the collapse of the expanded flow path (24c) due to the seating pressure.

The rib (31c) extends in a stripe shape in the flow path axis direction of the expanded flow path (24c). Accordingly, the rib (31c) can rectify the flow of air in the expanded flow path (24c) along the flow path axis.

When viewed in the pad thickness direction, the rib (31c) extends across the hanging-in groove (23), which is a groove for hanging therein the seat cover formed on the pad front surface (21) of the seat pad (2). Accordingly, the reinforcement by the rib (31c) can rationally reduce the collapse of the periphery of the hanging-in groove (23) in which the pad thickness is reduced due to the formation of the hanging-in groove (23).

The lid (31) includes the connecting port (31d) to the connecting member (4) connected to communicate with the ventilation flow path (24), and the flange (31e) protruding in a flange shape from the inner peripheral edge of the connecting port (31d) toward the inside of the flow path of the ventilation flow path (24). Thus, by providing the flange (31e), the rigidity of the lid (31) can be further enhanced.

The seat pad (2) forms the back pad (2) which is a pad member of the seatback (101). The lid (31) includes the support contact portion (31b) in contact with the lumbar support (5) that supports the lower region of the seatback (101) from the seat rear side, and the connecting lid (31a) formed with the connecting port (31d) to the connecting member (4) connected above the lumbar support (5) to communicate with the ventilation flow path (24). Accordingly, the lower region of the seatback (101) can be more appropriately supported by the lumbar support (5). Further, the support contact portion (31b) can appropriately disperse the seating load applied to the seatback (101) by the lid (31) being in contact with the lumbar support (5). Further, the connecting member (4) can be rationally provided at a position without interfering with the lumbar support (5).

Other Embodiments

Although the present invention has been described above with reference to one embodiment, the present invention can be implemented in various forms other than the above embodiment.

1. The cushion body may be applied not to a seatback but to a seat cushion.
2. The seat pad can be widely applied not only to an automobile seat but also to a seat for wheeled vehicles other than automobiles of railways and the like, a seat for various vehicles such as aircrafts and ships, and a seat other than seats for vehicles used in a public facility such as a movie theater or in a house.
3. In the above embodiment, the contact portion is the peripheral edge of the flow path lid, and the lid is the region other than the peripheral edge. The contact portion may include a region other than the peripheral edge that extends flush with the peripheral edge (for example, the support contact portion 31b in FIG. 5). The support contact portion of the lid may be configured to be retracted rearward with respect to the contact portion. The flow path lid may be configured to be assembled to the pad rear surface by any locking structure rather than an adhesive. The flow path lid may have a configuration in which not only the peripheral edge but also a portion of the lid in contact with the pad rear surface is bonded to the pad rear surface. The flow path lid may be shaped integrally with the pad body.

4. The lid protrudes in a stepped shape toward the seat rear side by being curved to cover the seat at a position retracted to the seat rear side, but may protrude in other curved shapes.

5. The ribs may be provided in any shape, position, and number as long as they protrude into the flow path of the expanded flow path.

6. Other than the shape illustrated in the above embodiment, the ventilation flow path may have any shape as long as it has a concave shape extending along the pad rear surface.

7. Other than the lumbar support, the structure in contact with the flow path lid to support the central portion of the cushion body may be a contour mat or a spring member such as an S-shaped spring.

What is claimed is:

1. A cushion body comprising:
a seat pad having a concave ventilation flow path extending along a pad rear surface of the seat pad; and a planar flow path lid covering the pad rear surface of the seat pad so as to cover the concave ventilation flow path, wherein
the seat pad has an expanded flow path in which a flow path width of the ventilation flow path is partially expanded, and
the planar flow path lid includes a contact portion in contact with the pad rear surface, and a lid curved to cover the concave ventilation flow path including the expanded flow path at a position retracted to a seat rear side with respect to the contact portion.

2. The cushion body according to claim 1, wherein
the lid has a rib protruding toward an inside of the concave ventilation flow path at the expanded flow path.

3. The cushion body according to claim 2, wherein
the rib has a stripe shape extending in a flow path axis direction of the expanded flow path.

4. The cushion body according to claim 2, wherein
when viewed in a pad thickness direction, the rib extends across a hanging-in groove configured to hold therein a seat cover and formed on a pad front surface of the seat pad.

5. The cushion body according to claim 1, wherein
the lid includes a connecting port to a connecting member connected to communicate with the ventilation flow path, and a flange protruding in a flange shape from an inner peripheral edge of the connecting port toward the inside of the expanded flow path of the concave ventilation flow path.

6. The cushion body according to claim 1, wherein
the seat pad forms a back pad which is a pad member of a seatback, and
the lid includes a support contact portion configured to be in contact with a lumbar support for supporting a lower region of the seatback from the seat rear side, and a connecting lid formed with a connecting port to a connecting member connected above the lumbar support to communicate with the ventilation flow path.

7. A planar flow path lid configured to cover a pad rear surface of a seat pad so as to cover a concave ventilation flow path a extending along the pad rear surface of the seat pad comprising:
a contact portion configured to be in contact with the pad rear surface, and
a lid curved to cover the concave ventilation flow path at a position retracted to a seat rear side with respect to the contact portion.

8. The lid according to claim 7 further comprising:
a connecting port to a connecting member connected to communicate with the ventilation flow path; and
a flange protruding in a flange shape from an inner peripheral edge of the connecting port toward an inside of the concave ventilation flow path.

9. The lid according to claim 8 further comprising a lib having a stripe shape extending in a flow path axis direction of the ventilation flow path.

* * * * *